(12) United States Patent
Nagatomi et al.

(10) Patent No.: US 6,319,485 B1
(45) Date of Patent: *Nov. 20, 2001

(54) MAGNETIC MATERIAL AND PRODUCTION METHOD THEREOF

(75) Inventors: Akira Nagatomi; Fumikazu Kanamaru, both of Hyogo-ken; Shinichi Kikkawa, Osaka-fu, all of (JP)

(73) Assignee: Dowa Mining Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/232,710

(22) Filed: Jan. 19, 1999

(30) Foreign Application Priority Data

May 22, 1998 (JP) .................................. 10-141261

(51) Int. Cl.[7] .............................. C22C 29/16; H01F 1/01; C01B 21/00
(52) U.S. Cl. .......................... 423/409; 75/230; 148/306; 423/143; 423/151
(58) Field of Search .................... 423/143, 151, 423/409; 23/305 F; 252/62.51 R, 62.55; 75/348, 352, 354, 230; 148/306

(56) References Cited

U.S. PATENT DOCUMENTS 5,330,554 * 7/1994 Koyano et al. ................. 75/354

FOREIGN PATENT DOCUMENTS

359045911A * 3/1984 (JP) .

OTHER PUBLICATIONS

Hawley's Condensed Chemical Dictionay, 13th edition, p. 924, 1999.*
The 36th Symposium of Ceramics Basic Science, A Collection of the Gist of Lectures, Jan. 20, 1998, pp. 60–61.

* cited by examiner

Primary Examiner—Steven P. Griffin
Assistant Examiner—Maribel Medina
(74) Attorney, Agent, or Firm—McDermott, Will & Emery (57) ABSTRACT

A magnetic material made up of an assembly of particles substantially consisting of an $\alpha''$-$Fe_{16}N_2$ crystal having a body-centered tetragonal system (bct). The magnetic material has a high saturated magnetic flux density and is directly synthesized by reacting fine particles of $\alpha$-Fe and a nitrogen-containing gas at a temperature of 200° C. or lower. By the synthesis of this invention, $\alpha''$-$Fe_{16}N_2$, which is a metastable compound conventionally deposited accompanied with phase transformation of crystallization from a martensite phase of $\alpha'$-Fe(N), is obtained as an isolated bulk substance in a single phase.

2 Claims, 8 Drawing Sheets

MAGNETIC MATERIAL AND PRODUCTION METHOD THEREOF

FIELD OF THE INVENTION

The present invention relates to a magnetic material having a high saturation magnetic flux density obtained by chemically synthesizing, as an isolated crystal, $\alpha''\text{-Fe}_{16}\text{N}_2$ of a metastable phase, which is originally crystallized in the case of annealing a martensite having nitrogen dissolved therein, and to a production method of the magnetic material.

BACKGROUND OF THE INVENTION

Of Fe-N-based compounds, $\alpha''\text{-Fe}_{16}\text{N}_2$ is known as a metastable compound crystallized in the case of annealing a martensite having nitrogen dissolved therein for a long time. Though the crystal of $\alpha''\text{-Fe}_{16}\text{N}_2$ is a bct structure (body-centered tetragonal system) and is expected as a giant magnetic substance having a large saturation magnetization, there has hitherto been no example to report that the compound is chemically synthesized in an isolated state.

Hitherto, to prepare $\alpha''\text{-Fe}_{16}\text{N}_2$, various methods such as a vapor-deposition method, an MBE (molecular beam epitaxy) method, an ion implantation method, a sputtering method, an ammonia nitriding method, etc., have been tried. However, since $\alpha''\text{-Fe}_{16}\text{N}_2$ is in a metastable phase, and $\gamma'\text{-Fe}_4\text{N}$, $\epsilon\text{-Fe}_{2\text{-}3}\text{N}$, etc., which are more stable than $\alpha''\text{-Fe}_{16}\text{N}_2$, are liable to form, it is difficult to produce $\alpha''\text{-Fe}_{16}\text{N}_2$ as a single compound by isolating it. Also, even when the $\alpha''\text{-Fe}_{16}\text{N}_2$ crystal is obtained as a thin film, there is a limitation in the application of such a thin film to a magnetic material.

Accordingly, various attempts for producing the powders of $\alpha''\text{-Fe}_{16}\text{N}_2$ have been made. For example, JP-A-8-165502 proposes a method wherein powders of Fe(N) rich in $\alpha'$ (martensite phase) are formed by quenching powders of Fe(N) from a $\gamma$ phase (austenite phase) and further grinding the powders to form a strain induced martensite, and the powders of the martensite phase are subjected to an annealing treatment to crystallize $\alpha''\text{-Fe}_{16}\text{N}_2$ However, even by this method, it cannot be avoided that $\alpha$-Fe remains. In fact, in the working examples described in the above-cited patent publication, the content of $\alpha''\text{-Fe}_{16}\text{N}_2$ is less than 80% by weight, and thus, the product obtained by the method cannot be a powder of the $\alpha''\text{-Fe}_{16}\text{N}_2$ single phase.

Also, JP-A-7-118702 proposes a method wherein a pure iron powder is reacted with a mixed gas of ammonia and hydrogen and retained at high temperatures for a long time to form a powder of an austenite single phase, the powder is quenched from an austenite single phase of a high temperature to form a powder of a martensite main phase, and the powder is then subjected to an aging treatment, whereby a powder having a trace amount of the $\alpha''\text{-Fe}_{16}\text{N}_2$ phase is deposited in a martensite having nitrogen dissolved therein is formed, followed by further subjecting to a grinding treatment in a nitrogen atmosphere to accelerate the deposition of $\alpha''\text{-Fe}_{16}\text{N}_2$. However, even by this method, the content of the $\alpha''\text{-Fe}_{16}\text{N}_2$ phase is at most about 70% by volume.

Because in the method of crystallizing $\alpha''\text{-Fe}_{16}\text{N}_2$ from a martensite phase [$\alpha'\text{-Fe(N)}$], $\alpha''\text{-Fe}_{16}\text{N}_2$ exists as a deposition phase in a metal texture, it is difficult to separate the crystal compound of $\alpha''\text{-Fe}_{16}\text{N}_2$ as a single phase. Accordingly, by the crystallization method of $\alpha''\text{-Fe}_{16}\text{N}_2$ accompanied by such phase transformation, a magnetic material of the $\alpha''\text{-Fe}_{16}\text{N}_2$ single phase cannot be obtained. This is true when the material is in a powder form, and the above-described matter is also found in the method of crystallizing $\alpha''\text{-Fe}_{16}\text{N}_2$ in a powder as shown in the above-cited patent publications.

Also, in the thin-film forming method, even when a thin film of $\alpha'\text{-Fe}_{16}\text{N}_2$ is obtained, use of such a thin film as a general-purpose magnetic material is problematic in productivity and economy.

SUMMARY OF THE INVENTION

Accordingly, an object of the present invention is to obtain a crystal compound of $\alpha''\text{-Fe}_{16}\text{N}_2$ in a separated form from a mother phase, different from the crystallization by a heat treatment accompanied by phase transformation as described above and to provide a magnetic material substantially consisting of an $\alpha''\text{-Fe}_{16}\text{N}_2$ crystal compound.

As a result of making various investigations about chemical synthesis methods of $\alpha''\text{-Fe}_{16}\text{N}_2$ for attaining the above-described object, the inventors have succeeded in synthesizing $\alpha''\text{-Fe}_{16}\text{N}_2$ as a bulk substance in an $\alpha''\text{-Fe}_{16}\text{N}_2$ crystal single phase. That is, it becomes possible to chemically synthesize a crystal itself of $\alpha''\text{-Fe}_{16}\text{N}_2$ which is a metastable compound without using the conventional crystallization by a phase transformation process. Therefore, according to the present invention, there is provided a magnetic material made up of an assembly of particles each substantially consisting of an $\alpha''\text{-Fe}_{16}\text{N}_2$ crystal having a body-centered tetragonal system (bct). That is, the particles are a single phase of the $\alpha''\text{-Fe}_{16}\text{N}_2$ crystal and the particle powder has a high saturation magnetic flux density (saturation magnetization).

Such particle powders of the single phase of the $\alpha''\text{-Fe}_{16}\text{N}_2$ crystal can be directly synthesized by reacting fine particles of $\alpha$-Fe and a nitrogen-containing gas such as an ammonia gas at a temperature of 200° C. or lower, preferably 150° C. or lower, and more preferably 120° C. or lower.

DETAILED DESCRIPTION OF THE INVENTION

The present invention is described in detail.

As described above, in spite of the matter that $\alpha''$-Fe$_{16}$N$_2$ is expected to be used as a giant magnetic material having a high saturation magnetization, hitherto, the synthesis of $\alpha''$-Fe$_{16}$N$_2$ as a single phase bulk substance has not been succeeded, and therefore, $\alpha''$-Fe$_{16}$N$_2$ has never been used as a general-purpose magnetic material. The present inventors have found that by subjecting fine particle powders of $\alpha$-Fe to a nitriding treatment under certain conditions, a crystal of $\alpha''$-Fe$_{16}$N$_2$ in a single phase can be synthesized. Also, it has been confirmed that the particle powders of the $\alpha''$-Fe$_{16}$N$_2$ crystal obtained have a large saturation magnetization and hence, are an excellent magnetic material.

In regard to the Fe-N-based compounds, there are various iron nitrides having a compositions shown by Fe$_n$N, wherein n is 8, 4, 3, 2, or 1 and in ordinary nitriding of $\alpha$-Fe with a nitrogen-containing gas, compounds of various phases are formed together. The present inventors previously made experiments of nitriding Fe foils with ammonia and found that as the nitriding temperature is lowered, a crystal phase having a less content of nitrogen is formed. Also, it has been confirmed that at a low temperature of 210° C. or lower, $\alpha''$-Fe$_{16}$N$_2$ is formed. However, because at such a low temperature, the diffusion of nitrogen atoms is slow, it was difficult to form a single phase of $\alpha''$-Fe$_{16}$N$_2$.

On the other hand, it has been found that when the fine powders of $\alpha$-Fe are used as a raw material and subjected to a nitriding treatment with a nitrogen-containing gas for a long time at a low temperature of from 100 to 200° C., $\alpha''$-Fe$_{16}$N$_2$ is formed. In order to obtain particle powders consisting of a crystal of $\alpha''$-Fe$_{16}$N$_2$ in a single phase, various factors such as particle size, composition, and purity of the raw material iron powder, kind and concentration of the nitriding gas, nitriding temperature (reaction temperature), retention time (reaction time), etc., are concerned, and so far as the particle size of the iron powder is concerned, the smaller, the better.

As the nitriding gas, though a nitrogen gas, a mixed gas of nitrogen and hydrogen, an ammonia gas, etc., can be used, the use of an ammonia gas is convenient. Also, it is preferred that prior to the nitriding treatment, the oxide film existing on the surface of the raw material iron powder is reduced with a hydrogen gas.

The nitriding time and the retention time are important factors for forming the single phase of $\alpha''$-Fe$_{16}$N$_2$, and as shown in the Examples described hereinbelow, it has been found that in the case of nitriding fine Fe particles having a particle size of 20 nm as a raw material with an ammonia gas, it is better to carry out the nitriding at a temperature of 120° C. or lower for at least one day, and preferably at from 100 to 120° C. for from 1 to 12 days, and most suitably at 110° C. for 10 days, the particle powders of the single phase of $\alpha''$-Fe$_{16}$N$_2$ are obtained. About the reaction temperature and the retention time for the nitriding treatment, the optimum ranges vary depending on the form (particle size and composition) of the iron powder used and the kind and the concentration of the nitriding gas used, but in the case of using an iron powder having a particle size of not larger than 50 nm as a raw material, it is considered to be better that the temperature is in a range of from 100 to 200° C. and that the reaction time is in a range of from 0.5 to 12 hours.

Then, $\alpha''$-Fe$_{16}$N$_2$ of the present invention is practically described by the following Examples.

An iron powder of a composition (weight %) shown in Table 1 having a particle size (measured from the X-ray half width), which was used in the following Examples, was prepared.

TABLE 1

| Composition (weight %) of $\alpha$-Fe Powder | | | | | | | |
| --- | --- | --- | --- | --- | --- | --- | --- |
| Al | Ni | Mg | Mn | Si | Ca | Na | Rest |
| 5 | 0.5 | 0.2 | 0.3 | 0.3 | 0.1 | 0.3 | Fe |

The fine iron powder was subjected to an ammonia nitriding treatment using an apparatus shown in FIG. 1 in the following examples.

Figure 1:
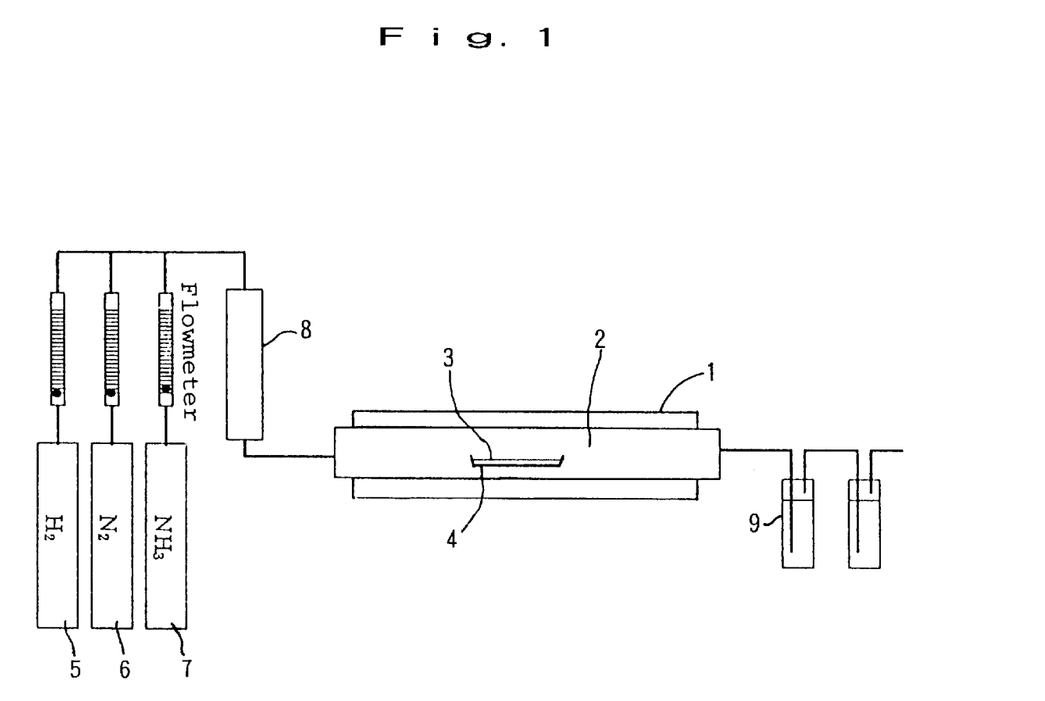
FIG. 1 is a schematic view of an apparatus used for the synthesis test of $\alpha''\text{-Fe}_{16}\text{N}_2$ according to the present invention.

In FIG. 1, numeral 1 is an electric furnace; a reaction pipe (quartz tube) 2 having an inside diameter of 30 mm is disposed in the electric furnace 1; and a tray 4 containing an iron powder sample 3 is set in the reaction pipe 2. To the reaction pipe 2 are connected a H$_2$ gas source 5, a N$_2$ gas source 6, and an ammonia gas source 7 each through a flowmeter, and a zeolite layer 8 as a drying agent is interposed in the middle portion of the passageway for introducing these gases into the reaction tube 2, whereby oxidation of the iron powders with a water vapor present in a trace amount in these gases is prevented. Also, in order to prevent intermixing of oxygen and a water vapor in air, oil traps 9 are disposed at the outlet side of the gases.

EXAMPLE 1

Figure 2:
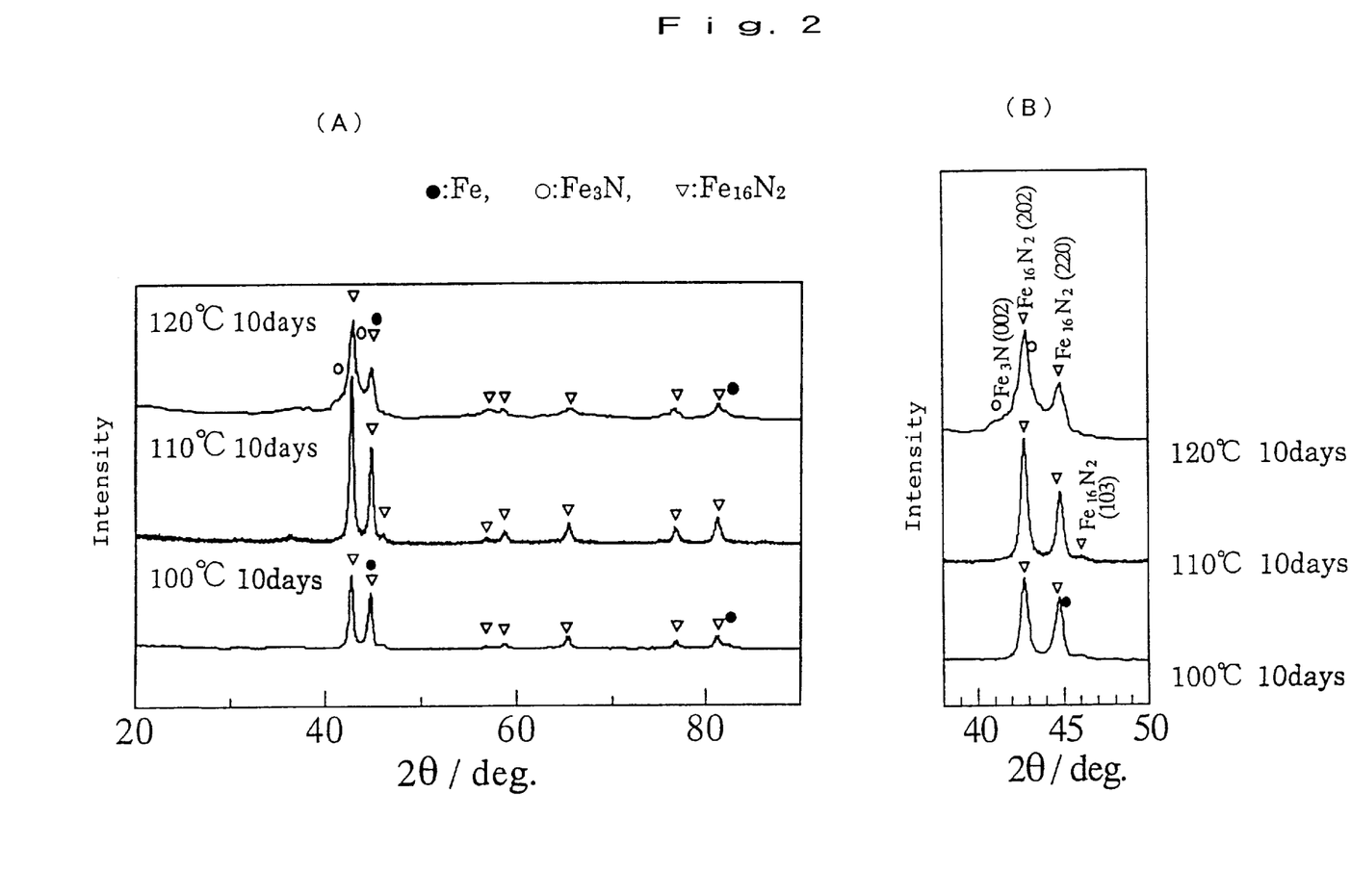
FIG. 2 is a graph showing X-ray diffraction patterns of products (Examples 1, 2 and 3) formed in the cases of changing the reaction temperature and the retention time in an ammonia nitriding treatment of fine particles of $\alpha$-Fe.

In the tray 4 was placed 5 g of the iron powder described above, a hydrogen gas was introduced into the reaction pipe 2 at a flow rate of 100 ml/minute, and after reducing an oxide film on the surface of the iron powder by maintaining the temperature in the reaction pipe 2 at 500° C., the iron powder was cooled to room temperature. Then, the hydrogen gas was changed to an ammonia gas, the ammonia gas was continuously introduced into the reaction pipe 2 at a flow rate of 100 ml/minute, and while maintaining the temperature in the reaction pipe 2 at 120° C., an ammonia nitriding treatment was carried out for 10 days. The product obtained was immersed in a silicone oil in an N$_2$ gas for preventing oxidation of the product with oxygen in air, the product was sampled, and identification of the crystal phase was carried out by a powder X-ray diffraction apparatus. The X-ray diffraction pattern thereof is shown in FIGS. 2A and B. FIG. 2B is an enlarged portion of the portion of 2θ: 38 to 50° of FIG. 2A.

EXAMPLE 2

The same procedure as in Example 1 was followed (retention time: 10 days) except that the reaction temperature (the temperature in the reaction tube) was changed to 110° C. The X-ray pattern thereof is shown together in FIG. 2.

EXAMPLE 3

The same procedure as in Example 1 was followed except that the reaction temperature (the temperature in the reaction tube) was changed to 100° C. and that the retention time at that temperature was set to be 10 days. The X-ray pattern thereof is shown together in FIG. 2.

EXAMPLE 4

Figure 3:
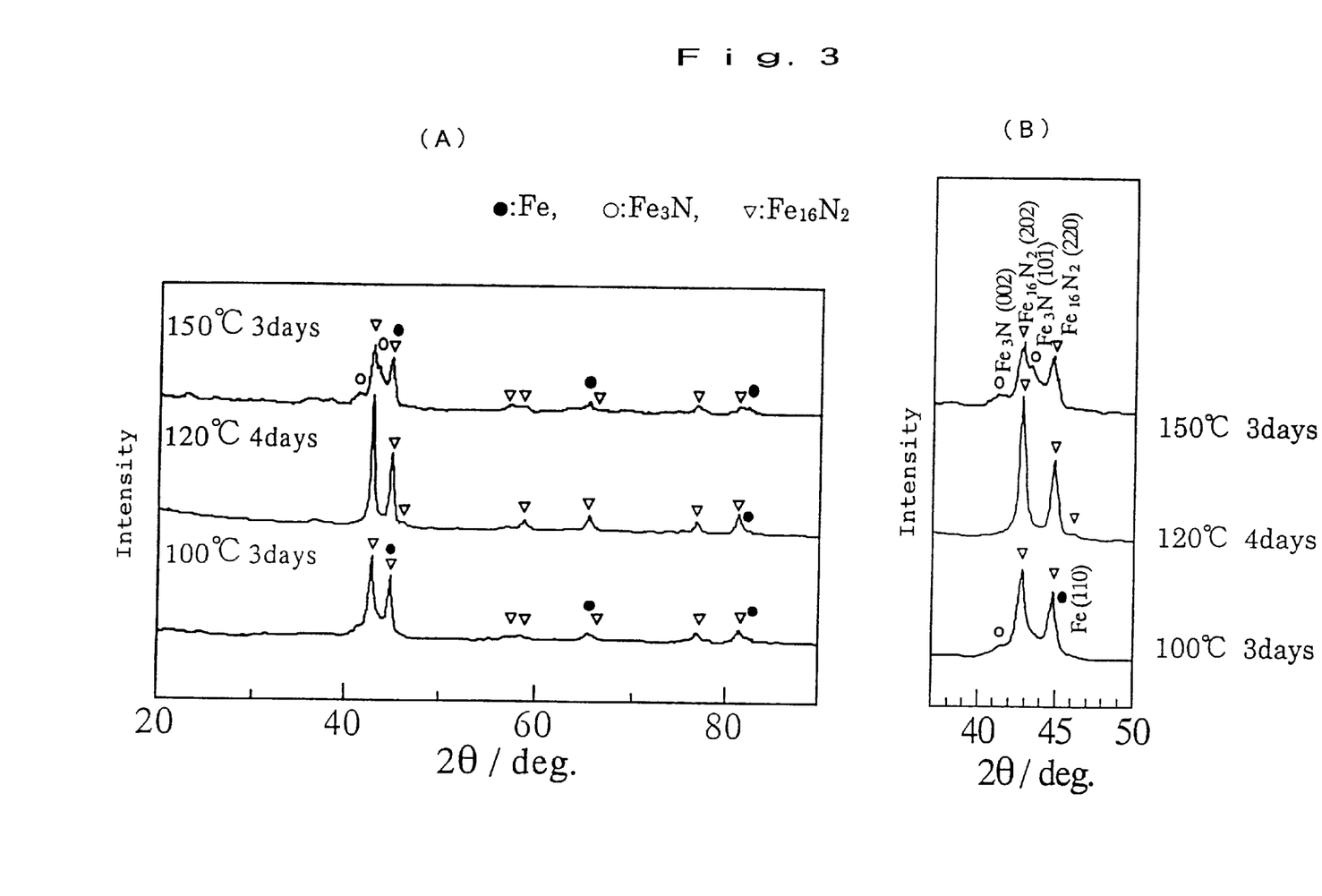
FIG. 3 is a graph showing X-ray diffraction patterns of products (Examples 4, 5 and 6) formed in the cases of changing the reaction temperature and the retention time in an ammonia nitriding treatment of fine particles of $\alpha$-Fe.

The same procedure as in Example 1 was followed except that the reaction temperature (the temperature in the reaction tube) was changed to 150° C. and that the retention time at that temperature was set to be 3 days. The X-ray diffraction pattern thereof is shown in FIGS. 3A and B. FIG. 3B is an enlarged portion of the portion of 2θ: 38 to 500 of FIG. 3A.

EXAMPLE 5

The same procedure as in Example 1 was followed except that the reaction temperature (the temperature in the reaction tube) was changed to 120° C. and that the retention time at that temperature was set to be 4 days. The X-ray pattern thereof is shown together in FIG. 3.

EXAMPLE 6

The same procedure as in Example 1 was followed except that the reaction temperature (the temperature in the reaction tube) was changed to 100° C. and that the retention time at that temperature was set to be 3 days. The X-ray pattern thereof is shown together in FIG. 3.

EXAMPLE 7

Figure 4:
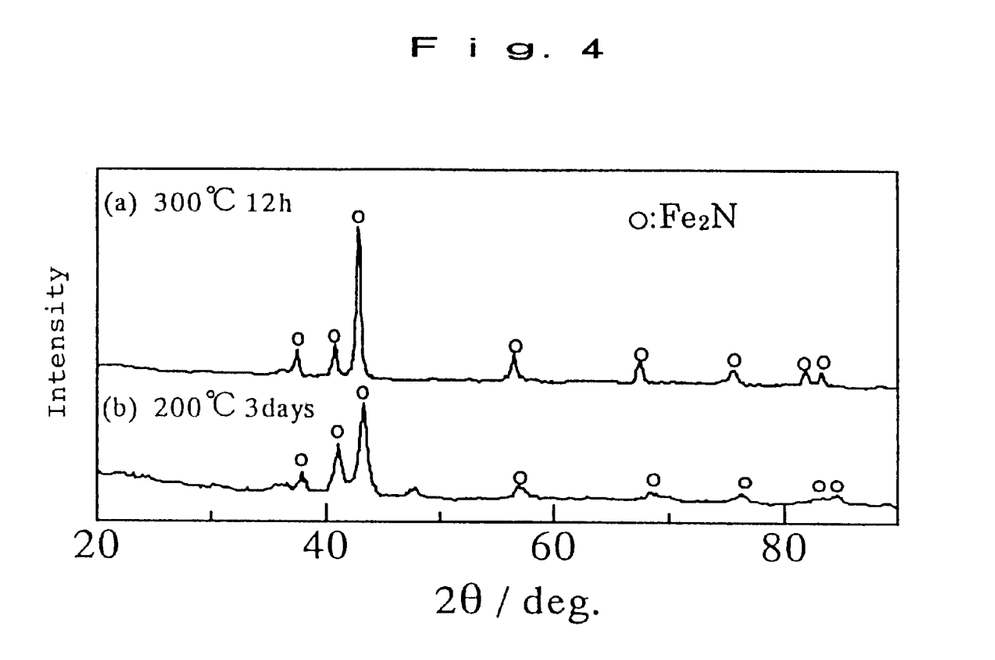
FIG. 4 is a graph showing X-ray diffraction patterns of products (Examples 7 and 8) formed in the cases of changing the reaction temperature and the retention time in an ammonia nitriding treatment of fine particles of $\alpha$-Fe.

The same procedure as in Example 1 was followed except that the reaction temperature (the temperature in the reaction tube) was changed to 300° C. and that the retention time at that temperature was set to be a half day. The X-ray pattern thereof is shown in FIG. 4.

EXAMPLE 8

The same procedure as in Example 1 was followed except that the reaction temperature (the temperature in the reaction tube) was changed to 200° C. and that the retention time at that temperature was set to be 3 days. The X-ray pattern thereof is shown together in FIG. 4.

About each of the products obtained in Examples 1 to 8, the crystal as identified from the X-ray diffraction is shown in Table 2 below.

TABLE 2

|           | Reaction temp. (° C.) | Retention time (days) | Crystal of formed phase |
|-----------|-----------------------|-----------------------|-------------------------|
| Example 1 | 120                   | 10                    | $\alpha''\text{-Fe}_{16}\text{N}_2$ |
| Example 2 | 110                   | 10                    | $\alpha''\text{-Fe}_{16}\text{N}_2$ |
| Example 3 | 100                   | 10                    | $\alpha''\text{-Fe}_{16}\text{N}_2$ (Fe) |
| Example 4 | 150                   | 3                     | $\alpha''\text{-Fe}_{16}\text{N}_2$ ($\text{Fe}_3\text{N}$, Fe) |
| Example 5 | 120                   | 4                     | $\alpha''\text{-Fe}_{16}\text{N}_2$ (Fe) |
| Example 6 | 100                   | 3                     | $\alpha''\text{-Fe}_{16}\text{N}_2$ (Fe) |
| Example 7 | 300                   | 0.5                   | $\text{Fe}_2\text{N}$ |
| Example 8 | 200                   | 3                     | $\text{Fe}_2\text{N}$ |

From the results of Table 2, it can be seen that in each of Examples 1 to 6, the $\alpha''\text{-Fe}_{16}\text{N}_2$ crystal is formed. More practically, even when the reaction temperature is high, and the retention time is short, though other phase exists together, in the appropriate reaction temperature and retention time, $\alpha''\text{-Fe}_{16}\text{N}_2$ is substantially formed. Particularly, it can be seen that in the case of Example 2, the crystal of $\alpha''\text{-Fe}_{16}\text{N}_2$ alone without containing other phase is obtained. Also, when the reaction temperature is high, and the retention time is short as in the cases of Examples 7 and 8, no $\alpha''\text{-Fe}_{16}\text{N}_2$ is formed at all, and $\text{Fe}_2\text{N}$ is a main phase.

Figure 5:
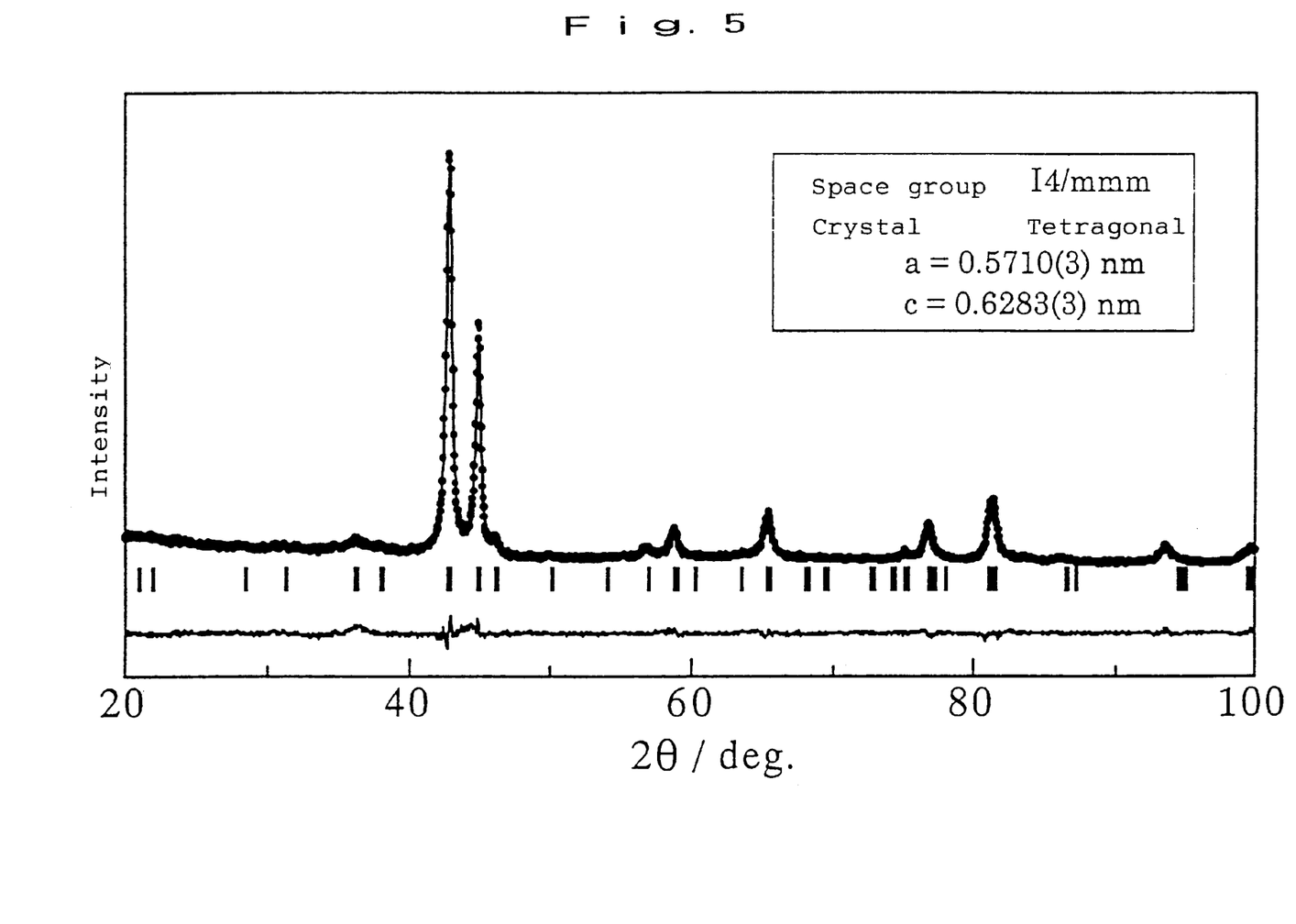
FIG. 5 is a graph showing an X-ray diffraction pattern and a lattice constant of the $\alpha''\text{-Fe}_{16}\text{N}_2$ crystal obtained by carrying out a Rietveld analysis from the X-ray diffraction results about the particle powders of $\alpha''\text{-Fe}_{16}\text{N}_2$.

About the particle powder consisting of only an $\alpha''\text{-Fe}_{16}\text{N}_2$ crystal as obtained in Example 2, from the X-ray diffraction result thereof, the Rietveld analysis was carried out to obtain a lattice constant and the atomic coordinates. The results are shown in FIG. 5, which shows $\alpha''\text{-Fe}_{16}\text{N}_2$ being a body-faced tetragonal system (bct) wherein the space group is I4/mmm, and in the lattice constant, A=0.571 nm and c=0.628 nm.

Figure 6:
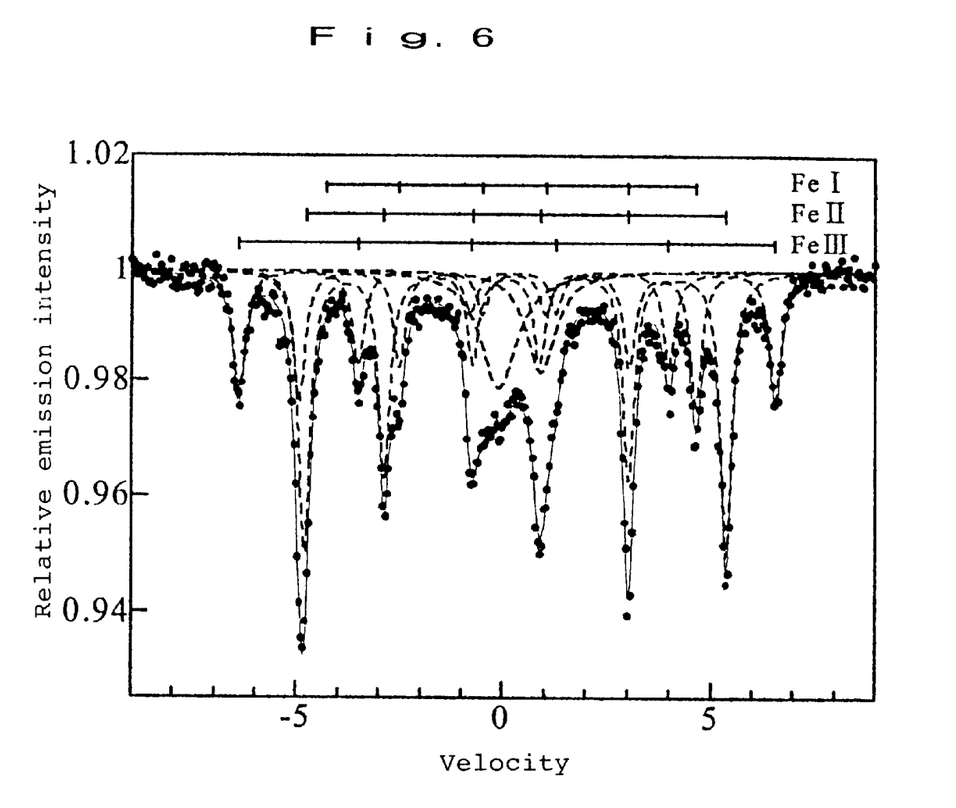
FIG. 6 is a graph showing Moessbauer spectra about the particle powders of $\alpha''\text{-Fe}_{16}\text{N}_2$.

About the particle powder consisting of only an $\alpha''\text{-Fe}_{16}\text{N}_2$ crystal as obtained in Example 2, a Moessbauer measurement was carried out. The Moessbauer spectra were shown in FIG. 6. As a result, it was found that the internal magnetic field of the third vicinal Fe atom adjacent to N had a value of 40.3 T. Also, from the values of the internal magnetic fields (29.8 T, 31.7 T, and 40.3 T, respectively) of the first vicinal Fe atom, the second vicinal Fe atom, and the third vicinal Fe atom of N, the magnetic moment of each Fe atom was calculated, and when the saturation magnetization of the single crystal of $\alpha''\text{-Fe}_{16}\text{N}_2$ was obtained from the values, the saturation magnetization was 245.2 emu/g.

Figure 7:
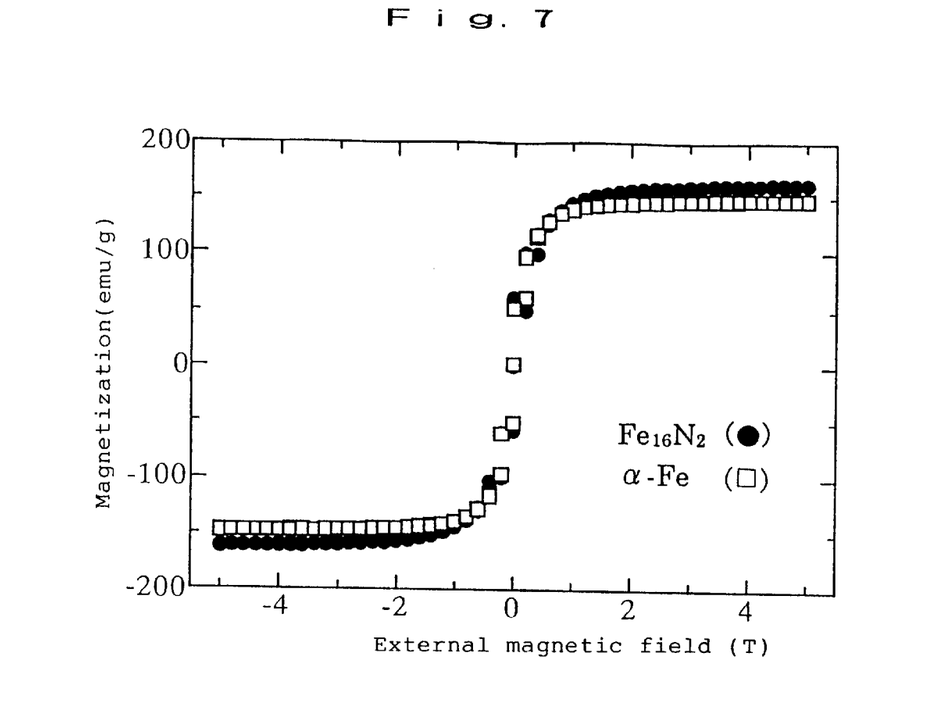
FIG. 7 is a view showing the measurement results of the magnetization about the particle powders of $\alpha''\text{-Fe}_{16}\text{N}_2$ at 290K (absolute temperature) in comparison with those of the fine particles of $\alpha$-Fe.

About the particle powder consisting of only an $\alpha\text{-Fe}_{16}\text{N}_2$ crystal as obtained in Example 2, the magnetization was measured. The measurement was carried out at 290K (absolute temperature) and 4K in a range of from −5 T to 5 T by changing the external magnetic field by 0.1 T. The results are shown in FIG. 7 (290K) and FIG. 8 (4K). For comparison, the measurement results of the fine iron particle powder of α-Fe used as the raw material are shown together in these figures.

Figure 8:
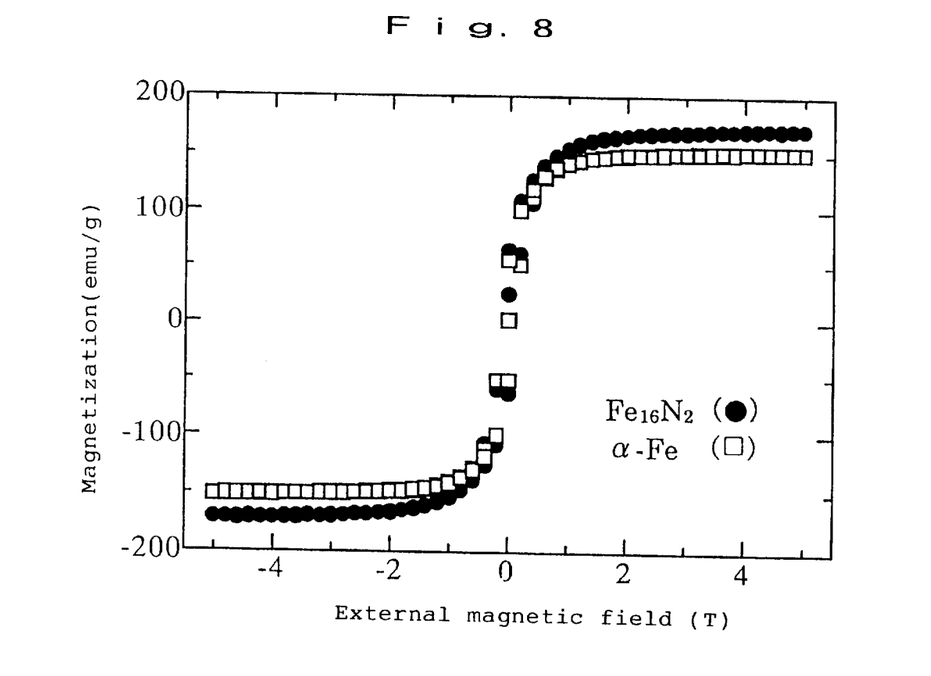
FIG. 8 is a view showing the measurement results of the magnetization about the particle powders of $\alpha''\text{-Fe}_{16}\text{N}_2$ at 4K in comparison with those of the fine particle of $\alpha$-Fe.
Figure 9:
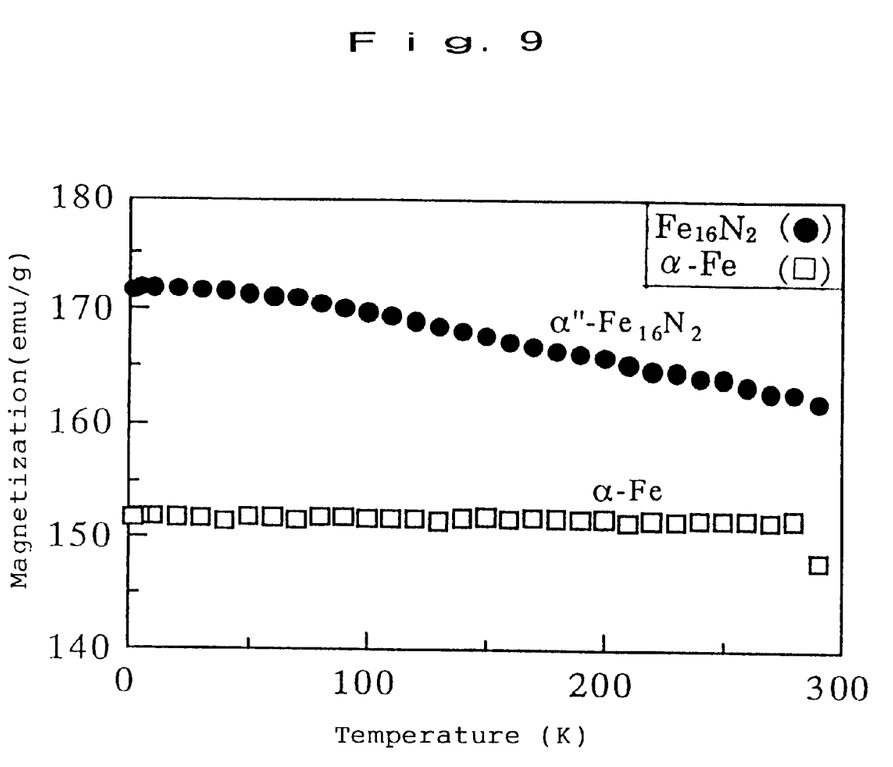
FIG. 9 is a view showing the temperature reliance of the magnetization about the particle powder of $\alpha''$-Fe$_{16}$N$_2$ in a temperature range of from 290K to 4K in comparison with that of the fine particles of $\alpha$-Fe.

As shown in FIG. 7, in the product obtained in Example 2, the saturation magnetization at normal temperature (290K) was 162 emu/g, which was larger than 148 emu/g of α-Fe. Similarly, as shown in FIG. 8, the saturation magnetization of the product obtained in Example 2 at 4K was 172 emu/g, which was also larger than 152 emu/g of α-Fe. FIG. 9 shows the temperature reliance of the magnetization measured about the particle powder obtained in Example 2 by applying an external magnetic field of 0.1 T while changing the temperature in a range of from 290K to 4K in comparison with that of α-Fe.

Though the saturation magnetization of the fine particles of α-Fe at room temperature fundamentally should have shown 220 emu/g, the value was 148 emu/g in the experiment. This may be considered that the surface of the fine particle of α-Fe was covered by an oxide film. Similarly, it may be considered that the sample obtained in Example 2 was covered by an oxide film before the measurement of the magnetization. Thus, from the saturation magnetization of 148 emu/g of the fine particles of α-Fe at room temperature, the amount of the oxide film of the fine particles was calculated, and assuming that an oxide film of the equivalent amount of the oxide film of the fine particle of α-Fe is formed on the surface of the fine particle of the $\alpha''\text{-Fe}_{16}\text{N}_2$ crystal as obtained in Example 2, the saturation magnetization of $\alpha''\text{-Fe}_{16}\text{N}_2$ becomes a vary large amount as high as 240 emu/g. This value substantially corresponds to 245.2 emu/g which is the value of the saturation magnetization obtained from the magnetic moment of each Fe atom described above.

As described above, in the present invention, $\alpha''\text{-Fe}_{16}\text{N}_2$, which is a metastable compound deposited accompanied with phase transformation of crystallization from a martensite phase of α"-Fe(N), is obtained as an isolated bulk substance in a single phase but not as a compound in a matrix. Thus, the present invention can provide a novel magnetic material, which has never been obtained by conventional techniques. Furthermore, because the synthesis thereof can be realized by a simple method at a relatively

What is claimed is:

1. A method of producing an iron nitride magnetic material, which comprises reacting fine particles of α-Fe and a nitrogen-containing gas at a temperature of not higher than 200° C. to directly synthesize an α"-$Fe_{16}N_2$ crystal having a body centered tetragonal system (bct).

2. A method of producing an iron nitride magnetic material of claim 1, wherein the nitrogen-containing gas is an ammonia gas.

* * * * *